Patented Nov. 7, 1944

2,362,026

UNITED STATES PATENT OFFICE 2,362,026

POLYVINYL ALCOHOL COMPOSITION

James D. Quist, Detroit, Mich., assignor to United States Rubber Company, New York, N. Y., a corporation of New Jersey No Drawing. Application December 12, 1941, Serial No. 422,722

6 Claims. (Cl. 260—90)

This invention relates to a polyvinyl alcohol composition, and in particular to a plasticized polyvinyl alcohol treated and/or compounded to resist liquids such as water and gasoline.

Among the objects of my invention are to provide a material which will resist both gasoline or the like and water; which will not contaminate fuel such as gasoline; which will be substantially impervious to both gasoline and water; which will retain flexible characteristics over wide ranges of temperature; which may be used in relatively thin layers as a lining for flexible bullet sealing walls; and, which may be manufactured efficiently and economically.

In the manufacture of tanks used for storing gasoline or the like, many flexible lining materials have been employed for the purpose of functioning, in part, as a bullet sealing medium. Much difficulty has been encountered in providing a flexible material for this purpose which will not affect or be affected by the contents of the tank. Rubber, of course, does not provide a satisfactory lining for tanks used for storing gasoline. Also various fabrics or combinations of fabric and rubber do not form an adequate impermeable container. In some cases linings have been formed of neoprene or of olefine polysulfide plastics commonly known as thiokol. Where these materials are used it has been found that the contents of the tank become contaminated and also that the walls or linings themselves do not form a satisfactory impervious material. This is particularly true when the contents of the tank is such as aviation gasoline, benzol, or other aromatic hydrocarbons.

While plasticized polyvinyl alcohol forms a good lining for material such as gasoline, it possesses very little resistance against the action of water. It is recognized that gasoline and like materials contain a small percentage of water and that water sometimes collects in gasoline tanks due to condensation within the tank. I have found that polyvinyl alcohol may be treated and/or compounded so that in addition to the inherent quality of plasticized polyvinyl alcohol in resisting gasoline and the like, it will also resist the influence of moisture or water. The polyvinyl alcohol may be plasticized with any known suitable plasticizer which is compatible with polyvinyl alcohol, and particularly with 40% glycerine.

I have found that an improvement may be made in the water resistant characteristics of plasticized polyvinyl alcohol from which water soluble materials have been first removed or not, prior to plasticization, by incorporating therein an inorganic oxidizing agent which is capable of oxidizing glycerine, such as sodium dichromate, potassium permanganate, etc.; preferably in aqueous solution; or compounds known as inorganic condensing agents, such as anhydrous calcium chloride, anhydrous stannous chloride, anhydrous zinc chloride, anhydrous iron chloride, and anhydrous aluminum chloride; or organic amines especially those insoluble or sparingly soluble in water, such as p,p'-diaminodiphenylmethane, phenyl-beta-naphthylamine, and N,N' diphenyl-para-phenylene diamine. When added to the plasticized polyvinyl alcohol in proper sequence, the effects of any two or more of the above groups function in combination to increase progressively the water resisting characteristics of the plasticized polyvinyl alcohol.

The resistance to water of plasticized polyvinyl alcohol can be increased by the incorporation of an inorganic oxidizing agent such as sodium or potassium dichromate or other water soluble chromate or dichromate, potassium or sodium permanganate, etc. in aqueous solution. These materials are added to the plasticized polyvinyl alcohol during a milling operation. The proportion by weight, based on the polyvinyl alcohol, of the oxidizing agent may range from .5% to about 3%. Such inorganic oxidizing agents reduce the swelling by water and produce a somewhat stiff jelly-like mass retaining some tensile strength after soaking. In contrast, the untreated polyvinyl alcohol when soaked swells and disintegrates to the point that it retains no measurable tensile strength. By the inclusion of 1.5% of sodium dichromate, a tensile strength of at least 50 pounds per square inch is retained after the material is soaked in water.

Inorganic condensing agents, such as anhydrous stannous chloride and anhydrous aluminum chloride result in a substantial reduction in the water absorption of the plasticized polyvinyl alcohol. The amount of the condensing agent may generally range from .5% to about 3%, based on the weight of the polyvinyl alcohol; in the case of aluminum chloride, the preferred amounts are from .1% to 2% because of its activity. By incorporating 1.5% of anhydrous stannous chloride in a stock containing 1.5% of sodium dichromate, there is retained in the material after soaking a tensile strength in the order of 115 pounds per square inch. 1% of anhydrous aluminum chloride, when added to plasticized compounded polyvinyl alcohol, reduces the percent of gain in weight of water to about 30% of the weight of the stock compared to 110% gain by the untreated stock. While aluminum chloride or stannous chloride, when used alone, increases the resistance to water, they are more desirably used in conjunction with other compounding ingredients.

Another class of materials which produce water repellent characteristics in the plasticized polyvinyl alcohol are the water insoluble or sparingly soluble organic amines, such as p,p'-diaminodiphenyl methane, phenyl-beta-naphthylamine and N,N' diphenyl-para-phenylene diamine. These organic bases (amines) among others appear to have a specific effect upon the plasticized polyvinyl alcohol and may be used in proportions ranging up to 10% or more, so long as the amine is soluble in the polyvinyl alcohol without bleeding out. This may be caused by a chemical bonding or a preferential absorption of the amines by the plasticized polyvinyl alcohol, since even water soluble amines, if present in quantities below 5% of the weight of the plasticized polyvinyl alcohol, reduce the water absorption of that material. Water insoluble secondary aromatic amines reduce the water absorption of the plasticized polyvinyl alcohol by as much as 50% while still retaining a substantial degree of tensile strength.

The effect of the three types of chemicals when added to plasticized polyvinyl alcohol in the order of adding the oxidizing agent first, followed by the other two chemicals in any order, results in progressively beneficial properties in the finished product. The oxidizing agents result principally in a jelling effect of the plasticized polyvinyl alcohol. The organic amines have as their principal effect an increase in the water repellent characteristics of the plasticized polyvinyl alcohol. The condensing agents function still further to reduce the water absorption properties of the plasticized polyvinyl alcohol. When these chemicals are compounded either individually or collectively in the proper sequence with a plasticized polyvinyl alcohol which previously has been treated or not (before being plasticized), with water to remove water soluble matter (as by soaking the polyvinyl alcohol in water for 3 days, squeezing, and then drying at room temperature), the collective results are a substantial improvement in a reduction of the water absorption characteristics and an increase in tensile strength of the finished product.

The following table describes the benefits of the invention as compared with untreated plasticized polyvinyl alcohol.

| Stock | Recipe | Quantity by weight | Per cent gain in weight upon soaking | Time soaked, hours | Tensile strength Dry | Tensile strength Wet |
|---|---|---|---|---|---|---|
| A | Polyvinyl alcohol / Glycerine | 60.0 / 40.0 | 110 | 18 | 1,500 | 10 |
| B | Plasticized polyvinyl alcohol / Sodium dichromate | 100.0 / 1.0 | 95 | 18 | | 50 |
| C | Plasticized polyvinyl alcohol / Potassium permanganate | 100.0 / 1.0 | 100 | 18 | | 16 |
| D | Plasticized polyvinyl alcohol / Phenyl-beta-naphthylamine | 100.0 / 10.0 | 75 | 18 | | 55 |
| E | Plasticized polyvinyl alcohol / p,p'-Diaminodiphenyl methane | 100.0 / 10.0 | 87 | 22 | | 40 |
| F | Plasticized polyvinyl alcohol / N,N'-diphenyl-p-phenylene diamine | 100.0 / 10.0 | 79 | 18 | 2,300 | 49 |
| G | Plasticized polyvinyl alcohol / Sodium dichromate / Phenyl-beta-naphthylamine | 100.0 / 1.0 / 5.0 | 90 | 18 | | 80 |
| H | Plasticized polyvinyl alcohol / Sodium dichromate | 100.0 / 1.5 | 90 | 20 | | 50 |
| I | Plasticized polyvinyl alcohol / Sodium dichromate / Phenyl-beta-naphthylamine | 100.0 / 1.5 / 5.0 | 74 | 24 | 1,300 | 94 |
| J | Plasticized polyvinyl alcohol / Sodium dichromate / Phenyl-beta-naphthylamine / Channel black | 100.0 / 1.5 / 5.0 / 5.0 | 75–80 | 24–150 | 1,300 | 95–120 |
| K | Plasticized polyvinyl alcohol / Sodium dichromate / Stannous chloride (anhydrous) | 100.0 / 1.5 / 1.0 | 66 | 72 | 1,450 | 117 |
| L | Plasticized polyvinyl alcohol / Sodium dichromate / Phenyl-beta-naphthylamine / Anhydrous stannous chloride | 100.0 / 1.5 / 5.0 / 1.0 | 50 | 72 | 1,600 | 150 |
| M | Plasticized polyvinyl alcohol / Sodium dichromate / Phenyl-beta-naphthylamine / Channel black | 100.0 / 1.0 / 5.0 / 10.0 | 53 | 24 | 1,100 | 100 |
| N | Plasticized polyvinyl alcohol / Sodium dichromate / Phenyl-beta-naphthylamine / Channel black / Anhydrous aluminum chloride | 100.0 / 1.0 / 5.0 / 10.0 / 1.0 | 33 | 24 | 2,000 | 300 |

In the above table the water absorption property of the finished material is tabulated because it is this characteristic which determines the merit of the resulting product. In combination with the reduction in water absorption properties, the resulting material should possess a reasonable degree of tensile strength.

The invention also provides for conferring on plasticized polyvinyl alcohol by the use of anhydrous aluminum chloride the property of becoming non-thermoplastic after molding. Since the chloride alone is very vigorous in its action, the method consists of milling into the plastic a mixture of phenyl-beta-naphthylamine or other low-melting organic amine and anhydrous aluminum chloride. 1 part, by weight, of the chloride powder is stirred into 5 parts, by weight, of the molten organic amine and the mixture is stirred until it solidifies. The solid is then pulverized and milled in as a powder. The compounded stock thus prepared is found to become non-thermoplastic to the extent of not being susceptible to molding after once having been molded at 300° F.

Tests show that molded samples of a polyvinyl alcohol stock treated in the immediate above manner varies in physical properties, depending upon the time of molding, and that a molded slab cannot be remolded. A molded slab can also be removed from the mold while hot without being distorted in shape. Hence the molded material is believed to have been cured to a degree dependent upon the length of time it is heated, as is substantiated by the following data.

| | Parts by weight |
|---|---|
| Polyvinyl alcohol | 60.0 |
| Glycerine | 40.0 |
| Sodium dichromate | 1.0 |
| Phenyl-beta-naphthylamine } added as a | 5.0 |
| Anhydrous aluminum chloride } mixture | 1.0 |
| Channel black | 10.0 |

| | Example O | Example P | Example Q | Example R |
|---|---|---|---|---|
| Minutes cure at 300° F | 10 | 20 | 40 | 60 |
| Time soaked in water hours | 24 | 24 | 24 | 24 |
| Per cent gain in weight | 40 | 30 | 33 | 32 |
| Green tensile, lbs./sq. in | 1,750 | 2,010 | 2,020 | 2,060 |
| Wet tensile do | 165 | 230 | 305 | 275 |
| Green permanent set (break) per cent | 22 | 22 | 20 | 16 |
| Wet permanent set (break) per cent | 15 | 15 | 14 | 13 |
| Per cent elongation: | | | | |
| Dry | 420 | 410 | 415 | 415 |
| Wet | 360 | 350 | 330 | 300 |

Aging tests on samples cured 30 minutes at 300° F. and 40 minutes at 300° F. show that after 190 hours in oil at 200° F. the stock does not lose its flexibility or tensile appreciably.

| Cure | Green elongation | Tensile green | Tensile aged 190 hours at 200° F. | Aged elongation |
|---|---|---|---|---|
| 30 minutes at 300° F | 425 | Lbs. per sq. in. 1,900 | Lbs. per sq. in. 1,500 | 425 |
| 40 minutes at 300° F | | | 1,500 | 420 |

The hot tensile on both unaged and aged samples are approximately 50–60 lbs. per sq. inch at 200–220° F., while the elongation is 250–300% and the permanent set less than 10%.

In accordance with the practice of my invention, I have found that by compounding plasticized polyvinyl alcohol, as above described, a material heretofore unknown has been produced which is flexible and which is impervious to and is substantially uninfluenced by the presence of water or gasoline and the like. The product before cure is one which may be processed to any desirable thickness and which may be spliced and joined together by the application of heat and pressure to thereby present a lining material of substantially improved characteristics and readily adaptable for bullet sealing walls of airplane gasoline tanks. The above referred to lining material may be used as such applied to metal, or fabric may be impregnated with the material and backed up by rubber and/or other fabric material, in the manufacture of stiffer or more pliable containers.

While I have described a preferred practice of my invention, it is to be understood that it is susceptible of those modifications which appear obvious and within the spirit of the invention, and as defined in the scope of the appended claims.

Having thus described my invention, what I claim and desire to protect by Letters Patent is:

1. A process of improving the water resistant characteristics of plasticized polyvinyl alcohol which comprises incorporating in the plasticized polyvinyl alcohol a substantially water insoluble secondary aromatic amine, and a chloride of an amphoteric metal.

2. A plasticized polyvinyl alcohol rendered water and gasoline resistant, and substantially non-thermoplastic at 300° F. by mixture with a fluxed mix of a substantially water insoluble secondary aromatic amine, and anhydrous aluminum chloride.

3. A tank lining composed in part of a molded layer of a plasticized polyvinyl alcohol of increased resistance to water and gasoline, and containing an inorganic oxidizing agent, a substantially water insoluble secondary aromatic amine, and an anhydrous halide of an amphoteric metal.

4. A plasticized polyvinyl alcohol composition for lining tanks containing sodium dichromate, a relatively water insoluble secondary aromatic amine, and anhydrous aluminum chloride, said composition being further characterized in setting at 300° F. to a substantially non-thermoplastic mass.

5. A process of improving the water resistant characteristics of plasticized polyvinyl alcohol which comprises incorporating thereinto a substantially water insoluble secondary aromatic amine.

6. A process of improving the water resistant characteristics of plasticized polyvinyl alcohol which comprises incorporating thereinto phenyl-beta-naphthylamine.

JAMES D. QUIST.